J. M. ROHLFING.
FRICTION DRAFT GEAR.
APPLICATION FILED JULY 20, 1914.
1,141,094. Patented May 25, 1915.
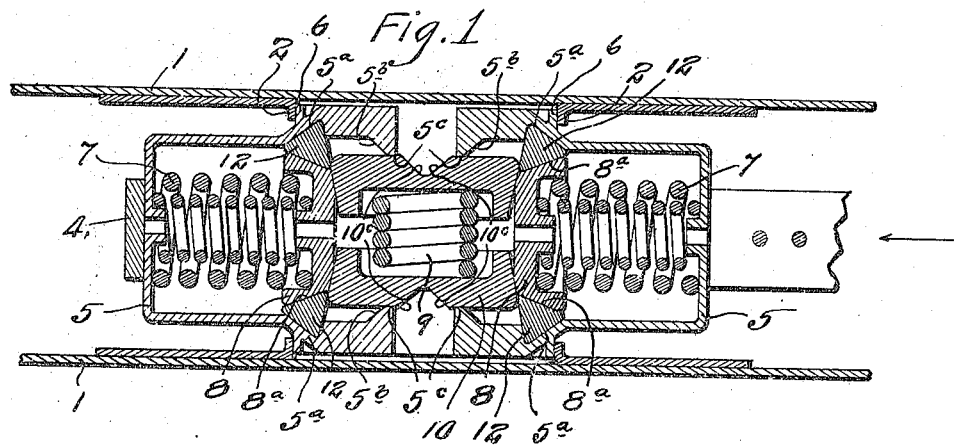
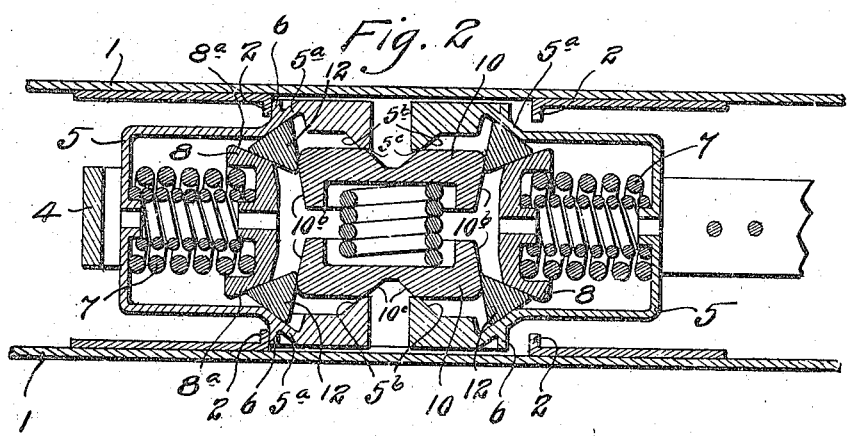
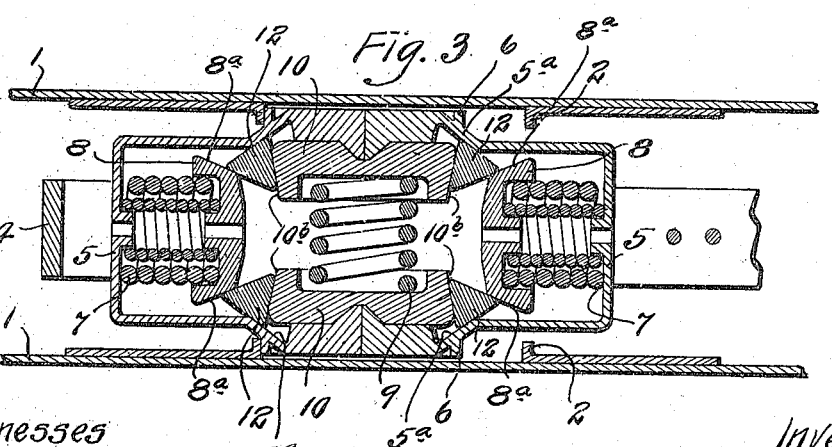
Witnesses
Wm. Janus
Inventor,
John M. Rohlfing,

UNITED STATES PATENT OFFICE.

JOHN M. ROHLFING, OF ST. LOUIS, MISSOURI, ASSIGNOR TO AMERICAN CAR AND FOUNDRY COMPANY, OF ST. LOUIS, MISSOURI, A CORPORATION OF NEW JERSEY.

FRICTION DRAFT-GEAR.

1,141,094. Specification of Letters Patent. Patented May 25, 1915.

Original application filed June 10, 1914. Serial No. 844,176. Divided and this application filed July 20, 1914. Serial No. 851,923.

*To all whom it may concern:*

Be it known that I, JOHN M. ROHLFING, a citizen of the United States, residing at No. 4217 Red Bud avenue, St. Louis, Missouri, have invented a certain new and useful Improvement in Friction Draft-Gear, of which the following is a full, clear, and exact description, such as will enable others skilled in the art to which it appertains to make and use the same, reference being had to the accompanying drawings, forming part of this specification, in which—

Figure 1 is a medial cross section of my friction draft gear showing the parts in expanded position. Fig. 2 is a similar cross section showing the parts in partially compressed position. Fig. 3 is a similar cross section with the gear in fully compressed position.

This application is a division of my copending application filed June 10, 1914, Serial Number 844,176.

My invention relates to an improved form of friction draft gear, and has for its principal purpose to provide a strong and smoothly operating gear which will accommodate all buffing and pulling stresses without imparting shock to the car, and further, obviate all releasing shocks by frictionally preventing sudden recoil of the gear when relieved of buffing or pulling stresses.

As illustrated in the drawings, 1 represents the draft sills having the draft lugs 2. 4 represents the yoke which embraces a pair of oppositely disposed casings 5 having the lugs 6 adapted to engage the draft lugs 2.

The casings 5 carry the draft springs 7 which coöperate at their inwardly presented ends with the friction plates 8.

Mounted between the friction plates 8 is a transverse spring 9 coöperating at either end with the transverse friction plates 10 and held under compression when the gear is in normal or expanded position.

The housings 5 are provided with the inclined friction faces $5^a$ and $5^b$. Loose friction elements 12 are disposed intermediate the adjacent friction plates 8, 10, and $5^a$ and coöperate with the friction surfaces $8^a$ and $10^b$, all of which converge in the direction of the center of the gear and the friction surfaces $5^a$ which diverge in the direction of the center of the gear. All of these adjacent friction surfaces have angular disposal relative to one another and support the loose friction elements 12 in contact with one another. The outer portions of the friction plates 10 coöperate with the longitudinally extending friction surfaces $5^c$ of the casings. Friction plates 10 have lateral friction surfaces $10^c$, all of which converge toward the center of the gear and the lateral surfaces $10^c$ are adapted to coöperate with the friction surfaces $5^b$.

Upon the application of a buffing stress to the yoke, the outer casing is forced inwardly, causing the two casings to approach each other against the influence of the draft springs. Friction is supplied by the coöperation of the friction faces $5^a$ and $8^a$ with the loose elements 12, and by the coöperation of friction faces $5^c$ with the outer faces of the plates 10. As the casings 5 approach each other, it is obvious that the sloping faces $5^a$ will force the loose elements inwardly between the faces $8^a$ and $10^b$, which action will tend to compress the draft springs. Meanwhile the transverse spring 9 remains under compression until the casings have moved sufficiently for the friction faces $5^b$ thereon to begin to ride down on the lateral friction faces $10^c$ of the plates 10. This will permit the transverse spring 9 to expand, forcing the plates 10 outwardly, until, at extreme compressed position, the parts occupy the position illustrated in Fig. 3, wherein the draft springs are compressed and the transverse spring expanded.

Upon the removal of the compressing stress, recoil of the gear is prevented by the engagement of the friction faces $5^b$ with the friction faces $10^c$ of the plates 10. The initial expanding influence of the draft springs, therefore, is consumed in overcoming the tendency of transverse spring 9 to expand and the friction between the faces $5^b$ and $10^c$. Friction is also supplied by the loose elements 12 with the friction faces coöperating therewith, and it will be observed that as the friction plates move inwardly due to the separating movement of the casings 5, they will operate, by virtue of the outwardly diverging faces $10^b$, to maintain a comparatively heavy friction between the loose elements and the faces $5^a$ and $8^a$. Hence all sudden recoil of the gear is prevented, and the parts assume their normal position gradually and without spring vibration.

I am aware that various changes and modifications may be made in the construction of the devices without departing from the spirit of my invention as indicated in the following claims.

I claim:

1. In a device of the class described, a movable casing, a draft spring coöperating with the same, a transversely operating spring, and a friction plate operable by said transverse spring to engage said casing to oppose movement of the latter by the draft spring.

2. In a draft gear, a movable casing, a draft spring coöperating with the same, friction elements coöperating with said casing and said draft spring, a transverse spring, and a friction plate coöperating with said transverse spring and said casing and adapted to be moved by said transverse spring so as to have increasing frictional engagement with said casing upon compression of the draft spring.

3. In a draft gear, a casing, a draft spring coöperating therewith and adapted to be compressed upon inward movement thereof, and a transverse spring coöperating with said casing and adapted to have expansive movement upon inward movement thereof.

4. In a draft gear, a movable casing, a draft spring coöperating therewith, and a transverse spring coöperating with said casing and adapted to oppose movement thereof under the expansive influence of said draft spring.

5. In a draft gear, a casing, a draft spring, and a transverse spring, said casing being adapted to have inward movement against the influence of said draft spring and outward movement against the influence of said transverse spring.

6. In a draft gear, a movable casing, a draft spring, a transverse spring, friction elements forming means of coöperation between said springs and said casing, said casing being adapted to have inward movement against the influence of said draft spring and outward movement against the influence of said transverse spring.

7. In a draft gear, a casing, a draft spring, friction elements operable by said draft spring to oppose inward movement of said casing, a transverse spring, and friction elements operable by said transverse spring and coöperating with said casing to oppose movement thereof.

In testimony whereof I hereunto affix my signature in the presence of two witnesses, this 17th day of July, 1914.

JOHN M. ROHLFING.

Witnesses:
  OSCAR HOCHBERG,
  JAMES J. COOPER.